United States Patent
Budge et al.

(10) Patent No.: US 7,602,982 B2
(45) Date of Patent: *Oct. 13, 2009

(54) METHOD FOR IMAGE CODING BY RATE-DISTORTION ADAPTIVE ZEROTREE-BASED RESIDUAL VECTOR QUANTIZATION AND SYSTEM FOR EFFECTING SAME

(75) Inventors: Scott E. Budge, Logan, UT (US); Qun Gu, San Jose, CA (US)

(73) Assignee: Utah State University, Logan, UT (US)

( * ) Notice: Subject to any disclaimer, the term of this patent is extended or adjusted under 35 U.S.C. 154(b) by 54 days.

This patent is subject to a terminal disclaimer.

(21) Appl. No.: 11/205,366

(22) Filed: Aug. 16, 2005

(65) Prior Publication Data

US 2006/0008165 A1 Jan. 12, 2006

Related U.S. Application Data

(63) Continuation of application No. 09/739,168, filed on Dec. 18, 2000, now Pat. No. 6,944,350.

(60) Provisional application No. 60/172,708, filed on Dec. 17, 1999.

(51) Int. Cl.
G06K 9/46 (2006.01)

(52) U.S. Cl. ...................... 382/239; 382/240
(58) Field of Classification Search ................ 382/240, 382/239
See application file for complete search history.

(56) References Cited

U.S. PATENT DOCUMENTS

| 5,031,037 A | | 7/1991 | Israelsen |
| 5,124,791 A | | 6/1992 | Israelsen et al. |
| 5,450,132 A | | 9/1995 | Harris et al. |
| 5,836,003 A | | 11/1998 | Sadeh |
| 5,881,176 A | * | 3/1999 | Keith et al. .................. 382/248 |
| 6,134,350 A | | 10/2000 | Beck |
| 6,157,746 A | * | 12/2000 | Sodagar et al. .............. 382/240 |

(Continued)

OTHER PUBLICATIONS

"Video coding using perceptually weighted vector zerotrees and adaptive vector quantization", Fowler, J.E.; 1998 International Conference on Image Processing, vol. 1, Oct. 4-7, 1998 pp. 117-121.*

(Continued)

*Primary Examiner*—Wenpeng Chen
(74) *Attorney, Agent, or Firm*—Workman Nydegger

(57) ABSTRACT

Methods and systems for encoding, transmitting and decoding digital images by rate-distortion adaptive zerotree-based residual vector quantization are disclosed. A method of the invention includes receiving a digital image, transforming the digital image into the wavelet domain generating a pyramid hierarchy, losslessly encoding a top LL subband from the pyramid hierarchy, encoding other subbands by vector quantization based on a zerotree insignificance prediction, generating an encoded image from the lossless encoding and vector quantization encoding, transmitting the encoded image along a communications channel, receiving the encoded image transmitted along the communications channel, reconstructing a zerotree from the encoded image, vector quantization decoding subbands from the encoded image other than a top LL subband, losslessly decoding the top LL subband from the encoded image, reverse wavelet transforming the top LL subband and the vector quantization decoded subbands and outputting a decoded image.

32 Claims, 11 Drawing Sheets

U.S. PATENT DOCUMENTS

| | | | |
|---|---|---|---|
| 6,229,927 B1 | 5/2001 | Schwartz | |
| 6,236,757 B1 | 5/2001 | Zeng et al. | |
| 6,483,946 B1* | 11/2002 | Martucci et al. | 382/240 |
| 6,553,148 B2* | 4/2003 | Zeng et al. | 382/240 |
| 6,865,291 B1 | 3/2005 | Zador | |
| 6,944,350 B2* | 9/2005 | Budge et al. | 382/240 |

OTHER PUBLICATIONS

M. Anotonini et al., "Image Coding using wavelet transform," IEEE Transactions on Image Processing, vol. 1., No. 2, pp. 205-220.

J.M. Shaprio, "Embedded image coding using zerotree of wavelet coefficients," IEEE Transactions on Signal Processing, vol. 41, pp. 3445-3452, Dec. 1993.

P.C. Cossman et al., "Tree-Structured vector quantization with significance map for wavelet image coding," Proc. 1995 IEEE Data Compression Conf. (DCC), Mar. 1995.

A.R. Calderbank et al., "Wavelet transforms that map integers to integers", Mathematics Subject Classification, Aug. 1996.

M.J. Gormish et al., "Lossless and nearly lossless compression for high quality images", Tech. Rep. Ricoh California Research Center, 2882 Sand Hill Road, Suite 115, Menlo Park, CA 94025-7022.

Qun Gu, Image Coding by Rate-Distortion Adaptive Zerotree-based Residual Vector Quantization (2000) (published Master of Science (M.S.) thesis, Utah State University, Logan, Utah on file with the Utah State University Library).

I. Debauchies et al., "Factoring wavelet transform into lifting steps", Tech. Rep. Lucent, Bell Laboratories, 1996.

D. Sampson et al., "Wavelet transform image coding using lattice vector quantization", Electronics Letter, vol. 30, pp. 1477-1478, Sep. 1994.

Office Action mailed May 10, 2007, for related U.S. Appl. No. 11/515,227.

U.S. Appl. No. 11/515,227, mailed Oct. 18, 2007, Final Rejection.

U.S. Appl. No. 11/515,227, mailed Jan. 7, 2008, Non-Final Rejection.

U.S. Appl. No. 09/739,168, mailed Jun. 16, 2004, Non-Final Rejection.

M. Anotonini et al., "Image Coding using wavelet transform," IEEE Transactions on Image Processing, vol. 1., No. 2, pp. 205-220, Apr. 1992.

M.J. Gormish et al., "Lossless and nearly lossless compression for high quality images", Tech. Rep. Ricoh California Research Center, 2882 Sand Hill Road, Suite 115, Menlo Park, CA 94025-7022, exact publish date unknown, but before Dec. 16, 2004.

* cited by examiner

METHOD FOR IMAGE CODING BY RATE-DISTORTION ADAPTIVE ZEROTREE-BASED RESIDUAL VECTOR QUANTIZATION AND SYSTEM FOR EFFECTING SAME

CROSS-REFERENCE TO RELATED APPLICATIONS

This application is a continuation of application Ser. No. 09/739,168, filed Dec. 18, 2000, now U.S. Pat. No. 6,944,350, issued Sep. 13, 2005, which claims benefit of priority pursuant to 35 U.S.C. § 119(e), from provisional patent application Ser. No. 60/172,708, filed Dec. 17, 1999, both of which are incorporated by reference.

BACKGROUND OF THE INVENTION

1. Field of the Invention

This invention relates to the field of image compression. More particularly, this invention relates to methods and systems for efficiently compressing still images and video frames using wavelet transformation and vector quantization.

2. State of the Art

Image compression may be classified into two categories of encoding: lossless and lossy. Lossless encoding techniques guarantee that the decompressed image from the compressed (encoded) data is identical to the original image. Lossy encoding is generally capable of achieving higher compression ratios versus lossless encoding, but at the expense of some loss of image fidelity. Exemplary conventional lossless image encoding techniques include run-length encoding, Huffman encoding, and Lempel/Ziv encoding. Exemplary conventional lossy image encoding techniques include transform encoding, vector quantization (VQ), segmentation and approximation methods, spline approximation methods and fractal encoding.

Image compression is particularly useful for transmitting and displaying graphical images over the Internet, where it takes more time to transmit the original image than a compressed image. Image compression is also useful for compressing digital video frames. The compression of digital video image frames is particular useful for such applications as video conferencing and video streaming.

The basic idea behind transform coding is decorrelating the original signal so that the signal energy may be redistributed among only a small set of transform coefficients. In this way, many coefficients may be discarded after quantization and before encoding. Generally, transform coding involves four steps: (1) image subdivision, which divides an image into smaller blocks, (2) transformation, such as a Discrete Cosine Transform (DCT) and a wavelet transform, (3) quantization, such as zonal coding and thresholding, and (4) encoding, such as Huffman encoding.

With regard to the quantization, vector quantization is an alternative to scalar quantization and may lead to better performance according to P.I.R.A. International, "Open information interchange study on image/graphics standards," Tech. Rep. Appendix, PIRA International, June 1993. A vector quantizer is a system which maps a K-dimensional Euclidean space $R^k$ to a finite subset X in $R^k$ made up of N vectors. This subset X becomes the vector codebook. An image can then be represented by the index of the codebook, and thus, be compressed.

Wavelet transforms have been applied to image compression. See e.g., M. Anotonini et al., "Image coding using wavelet transform," *IEEE Transactions on Image Processing*, vol. 1, no. 2, pp. 205-220; J. M. Shapiro, "Embedded image coding using zerotree of wavelet coefficients," *IEEE Transactions on Signal Processing*, vol. 41, pp. 3445-3462, December 1993; D. Sampson et al., "Wavelet transform image coding using lattice vector quantization," *Electronics Letters*, vol. 30, pp. 1477-78, September 1994; and P. C. Cossman et al., "Tree-structured vector quantization with significance map for wavelet image coding," Proc. 1995 IEEE Data Compression Conf (DCC), March 1995.

Wavelets are mathematic functions that provide joint time-frequency representation of a signal. Wavelets decompose data into different frequency components (known as subbands) and each component can be treated with a resolution matched to its scale. Wavelet transforms with the feature of joint locality can generate "sparse" coefficients, which are particularly useful for image compression. Additionally, the pyramid hierarchy of wavelet decomposition also enables many compression algorithms based on inter-band and cross-band relationships, such as zerotrees. See e.g., Shapiro supra. Although the wavelet transform reduces the correlation between image samples, high-order statistical dependencies still exist within or across subband coefficients. A vector quantizer may exploit these high-order statistical dependencies by jointly quantizing several coefficients. See e.g., A. N. Akansu et al., *Subband and Wavelet Transforms: Design and Applications*, Kluwer Academic Publishers, Norwell, Mass., 1996.

A wavelet is a mathematical function that satisfies certain mathematical requirements and is used in representing data (signal) or other functions. A wavelet provides an efficient and informative description of a signal, and is superior to the traditional Fourier transform in many fields, especially for fast transient and non-stationary signals. The wavelet has many useful properties, such as joint time (spatial)-frequency localization and multi-resolution representation.

Basis functions for the Fourier transform are sinusoids. In contrast, with the wavelet transform, various basis functions may be designed based on the features of a specific application. Most wavelets do not have analytical solutions. The wavelet transform may be implemented by iterating the quadrature mirror filters in a tree algorithm, as known to one of ordinary skill in the art. However, the wavelet tree algorithm as disclosed in Y. Sheng, *The Transforms and Applications Handbook*, Chapter "Wavelet Transform," CRC Press, in cooperation with IEEE, 1996, permits fast wavelet transform, and only requires fewer operations that the conventional fast Fourier transform (FFT).

In most cases images are stored and transmitted by integer or binary format. For hardware implementation of image processing, pure integer operation is often preferred. However, most filters, such as wavelets and wavelet packets, have floating point coefficients. Thus, it is desirable to use an efficient integer implementation of wavelet transform for image coding.

The lifting scheme as disclosed in I. Debauchies et al., "Factoring wavelet transform into lifting steps," Tech. Rep. Lucent, Bell Laboratories, 1996, the disclosure of which is incorporated herein by reference in its entirety for all purposes, supports perfect reconstruction and fast computation. In the lifting scheme, the wavelet transform is performed in the spatial domain. The basic idea behind the lifting scheme is a predict-update procedure, where the prediction error is related to the high-pass band and the updated prediction is related to the low-pass band.

With the proliferation of digital imagery in many applications including the Internet, there is a need in the art for methods and systems that perform image compression and decompression (coding and decoding) using a combination of lossless and lossy image encoding and decoding to obtain a high peak signal-to-noise ratio (PSNR) and high rates of speed.

BRIEF SUMMARY OF THE INVENTION

The present invention includes methods for image encoding by rate-distortion adaptive zerotree-based residual vector quantization and systems for effecting same.

A method embodiment for encoding a digital image by rate-distortion adaptive zerotree-based residual vector quantization in accordance with the present invention includes: obtaining a digital image, transforming the digital image into wavelet domain, thereby generating a pyramid hierarchy, losslessly encoding a top low-low (LL) subband of the pyramid hierarchy, thereby obtaining a losslessly encoded portion of the digital image, vector quantization (VQ) encoding all other subbands of the pyramid hierarchy based on a zerotree insignificance prediction thereby obtaining a lossy encoded portion of the digital image, and outputting an encoded image from the losslessly encoded portion and the lossy encoded portion of the digital image.

A method embodiment for decoding an image encoded by rate-distortion adaptive zerotree-based residual vector quantization in accordance with the present invention includes: obtaining an encoded image, reconstructing a zerotree from the encoded image, vector quantization decoding subbands in the encoded image other than a top LL subband, losslessly decoding the top LL subband, reverse wavelet transforming the top LL subband and the vector quantization decoded subbands; and outputting a decoded image from the decoded top LL subband and the decoded subbands other than the decoded top LL subband.

An integrated circuit embodiments for implementing a method for encoding and decoding, respectively, a digital image by rate-distortion adaptive zerotree-based residual vector quantization in accordance with the present invention are disclosed.

An integrated circuit embodiment for coding and decoding an image by rate-distortion adaptive zerotree-based residual vector quantization in accordance with the present invention is disclosed.

A circuit card embodiment for implementing a method for encoding and decoding an image using rate-distortion adaptive zerotree-based residual vector quantization in accordance with the present invention is disclosed.

A system embodiment for encoding, transmitting and decoding an image using rate-distortion adaptive zerotree-based residual vector quantization in accordance with the present invention is disclosed.

These embodiments and methods of the present invention will be readily understood by reading the following detailed description in conjunction with the accompanying figures of the drawings.

BRIEF DESCRIPTION OF THE SEVERAL VIEWS OF THE DRAWINGS

In the drawings, which illustrate what is currently regarded as the best mode for carrying out the invention and in which like reference numerals refer to like parts in different views or embodiments.

DETAILED DESCRIPTION OF THE INVENTION

The invention is a method for image coding by rate-distortion adaptive zerotree-based residual vector quantization and system for effecting same. While the method of the invention has many applications, the method of the invention is particularly useful for compressing images for transmission through a communication channel and then reconstructing the images at a remote location. The method of the invention uses a discrete integer wavelet transform using the lifting scheme. The terms "discrete integer wavelet transform," "discrete wavelet transform" and "DWT" are used interchangeably herein.

The wavelet bases of the method were selected based on the following considerations. First, perfect reconstruction is desirable for image coding, transmission and decoding. Second, since most images are smooth, it is desirable to use those mother wavelets with reasonably high vanishing moments. Additionally, the length of the finite impulse response (FIR) filters should be short so to enable fast computation and edge treatment. Note that for octave decomposition, the size of coarser subband becomes quite small when the decomposition level increases. Furthermore, it is desirable to have FIR filters that are linear phase, since that allows a cascaded pyramid structure without phase compensation. Qun Gu, Image Coding by Rate-Distortion Adaptive Zerotree-based Residual Vector Quantization (2000) (published Master of Science (M.S.) thesis, Utah State University, Logan, Utah, on file with the Utah State University Library), details methods of encoding and decoding images in accordance with the present invention, the entire contents of which are incorporated herein by reference for all purposes.

Figure 1:
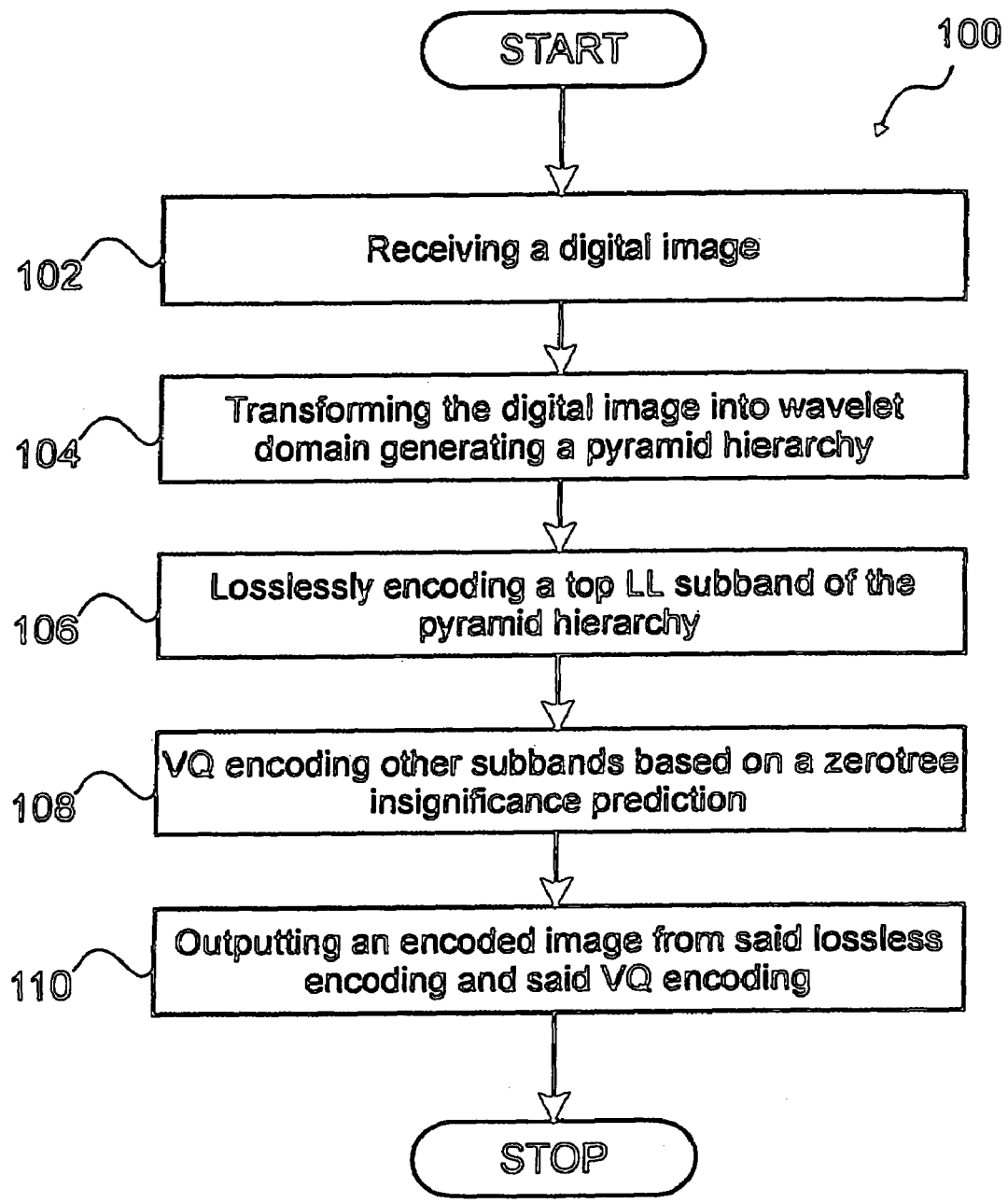
FIG. 1 is a flow chart of a method of encoding a digital image in accordance with the present invention.

FIG. 1 is a flow chart of a method 100 of encoding a digital image in accordance with the present invention. Method 100 may include obtaining 102 a digital image, transforming 104 the digital image into wavelet domain, thereby generating a pyramid hierarchy, losslessly encoding 106 a top low-low (LL) subband of the pyramid hierarchy, thereby obtaining a losslessly encoded portion of the digital image, vector quantization (VQ) encoding 108 all other subbands of the pyramid hierarchy based on a zerotree insignificance prediction, thereby obtaining a lossy encoded portion of the digital image, and outputting 110 an encoded image from the losslessly encoded portion of the image and the lossy encoded portion of the digital image.

Transforming 104 the digital image into wavelet domain may be accomplished using a 2-dimensional (2-D) separable octave decomposition which generates the pyramid hierarchy. Losslessly encoding 106 a top LL subband of the pyramid hierarchy may be accomplished using, for example and not by way of limitation, a differential pulse coded modulator (DPCM) in combination with Huffman coding, DPCM in combination with Universal source coding, DPCM in combination with arithmetic coding, and other suitable lossless encoding techniques known to one of ordinary skill in the art.

Wavelet transforms suitable for performing the discrete integer wavelet transform 104 according to the method of the invention may include, for example and not by way of limitation, the Daubechies' 9-7 symmetric wavelet transform, the Two Six (TS) transform, and the Two Ten (TT) wavelet transform.

The Daubechies' 9-7 symmetric biorthogonal wavelet transform is the presently preferred wavelet because it provides a good trade-off among the above considerations. The symmetric property of the Daubechies' 9-7 wavelet allows simple edge treatment. The analysis low-pass (LP) filter of the Daubechies' 9-7 wavelet of the present invention has nine taps and the analysis high-pass (HP) filter of the Daubechies' 9-7 wavelet of the present invention has seven taps. Both analysis and synthesis high-pass filters have four vanishing moments. This implies that the transform coefficients will be zero (or close to zero) for any signal that can be described by (or approximated by) a polynomial of 4th order or less. The filter coefficients of the Daubechies' 9-7 filter pair are shown in Table 1 below.

TABLE 1

| n | 0 | ±1 | ±2 | ±3 | ±4 |
|---|---|---|---|---|---|
| $2^{(-1/2)}h_n$ | 0.602949 | 0.266864 | −0.078223 | −0.016864 | 0.026749 |
| $2^{(-1/2)}\tilde{h}_n$ | 0.557543 | 0.295636 | −0.028772 | −0.045636 | 0 |

As noted above, the Daubechies' 9-7 symmetric wavelet transform of the present invention is implemented by the lifting scheme. The wavelet coefficients derived from the lifting scheme for the Daubechies' 9-7 symmetric wavelet transform are given by equations (1)-(4):

$$d_{1,l}^{(1)} = s_{0,2l+1} + \lfloor \alpha(s_{0,sl} + s_{0,2l+2}) + \tfrac{1}{2} \rfloor \quad (1)$$

$$s_{1,l}^{(1)} = s_{0,2l} + \lfloor \beta(d_{1,l}^{(1)} + d_{1,l-1}^{(1)}) + \tfrac{1}{2} \rfloor \quad (2)$$

$$d_{1,l} = d_{1,l}^{(1)} + \lfloor \gamma(s_{1,l}^{(1)} + s_{1,l+1}^{(1)}) + \tfrac{1}{2} \rfloor \quad (3)$$

$$s_{1,l} = s_{1,l}^{(1)} + \lfloor \delta(d_{1,l} + d_{1,l-1}) + \tfrac{1}{2} \rfloor \quad (4)$$

where "d" represent HP coefficients and "s" represent LP coefficients and where "$\lfloor \ \rfloor$" denotes truncation for integer operations. The constants derived from the Daubechies' 9-7 symmetric wavelet transform filter pair (see Table 2) and the lifting scheme may be given by the following approximations:

$\alpha \approx -1.586134342$ $\beta \approx -0.05298011854$ $\gamma \approx -0.8829110762$ $\delta \approx -0.4435068522$ $K \approx -1.149604398 \quad (5)$ The TS transform of the present invention is an integer wavelet transform derived from the (3, 1) biorthogonal wavelet transform of Cohen-Daubechies-Feauveau as disclosed in A. Cohen et al., "Biorthogonal bases of compactly supported wavelets," *Comm. Pure Appl. Math.*, vol. 45, pp. 485-560, 1992, the disclosure of which is expressly incorporated herein by reference in its entirety for all purposes. Here, the notation (3, 1) refers to the vanishing moments of the analysis and synthesis HP filter separately. The TS transform of the present invention has a two tap LP analysis filter, and a six tap HP analysis filter.

Implementation of the TS transform by the lifting scheme according to the method of the present invention includes calculating the following wavelet coefficients:

$$d_{1,l}^{(1)} = s_{0,2l+1} - s_{0,2l} \quad (6)$$

$$s_{1,l} = s_{0,2l} + \left\lfloor \frac{d_{1,l}^{(1)}}{2} \right\rfloor \quad (7)$$

$$d_{1,l} = d_{1,l}^{(1)} + \left\lfloor \frac{s_{1,l-1}}{4} - \frac{s_{1,l+1}}{4} + \frac{1}{2} \right\rfloor \quad (8)$$

It is known that even though the TS transform has three vanishing moments, it generally performs worse than those filters with comparable number of analysis vanishing moments. See for example, A. R. Calderbank et al., "Wavelet transforms that map integers to integers," *Mathematics Subject Classification*, August 1996. For this reason the Daubechies' 9-7 transform is preferred over the TS transform.

The TT transform of the present invention is derived from the Compression with Reversible Embedded Wavelets (CREW) system disclosed in M. J. Gormish et al., "Lossless and nearly lossless compression for high quality images," Tech. Rep., Ricoh California Research Center, 2882 Sand Hill Road, Suite 115, Menlo Park, Calif. 94025-7022, the contents of which are expressly incorporated herein by reference in its entirety for all purposes. The TT transform of the present invention has two taps in the LP analysis filter and ten taps in the HP analysis filter. The filter pair of the TT transform of the present invention is derived from the LeGall-Tabatabai polynomial of case "p=3," which is of degree 10 in $z^{-1}$. The TT transform of the present invention is defined by:

$$s(n) = \left\lfloor \frac{x(2n) + x(2n+1)}{2} \right\rfloor \quad (9)$$

$$d(n) = x(2n) - x(2n+1) + p(n) \quad (10)$$

where p(n) is defined by:

$$p(n) = \left\lfloor \frac{3s(n-2) - 22s(n-1) + 22s(n+1) - 3s(n2) + 32}{2} \right\rfloor \quad (11)$$

The TT transform is considered one of the most efficient wavelet decompositions. The special properties of the TT transform include: (1) the LP (smooth) coefficient has no growth in bit depth, i.e., if the input signal can be represented by b bits, the output LP coefficient can be represented by b bits, and (2) the HP (detailed) output coefficients require two additional bits for perfect reconstruction. Thus, the TT transform of the present invention is exactly reversible.

Because biorthogonal wavelet transformations in most cases cannot preserve energy according to Parseval's relation, it is necessary to employ a weighting scheme in order to use rate-distortion optimization techniques based on orthogonal transforms. When Parseval's relation holds, the distortion in the wavelet domain can be directly related to the distortion in the image domain. It is known that the biorthogonal wavelet transform with a scalar weighting scheme may result in minimum reconstruction error when using rate-distortion optimization techniques based on orthogonal transforms.

Let h(n) and g(n) denote the synthesis filter pair of a biorthogonal wavelet transform, and $w_l$ and $w_h$ as the weights for the LP and HP transform coefficients respectively. When the wavelet transform is implemented by the lifting scheme, the weights can be derived as:

$$w_l = \frac{\sqrt{2}\sum_L h(n)^2}{\left|\sum_L (-1)^n h(n)\right|^2} \tag{12}$$

$$w_h = \frac{\sqrt{2}\sum_L g(n)^2}{\left|\sum_L (-1)^n h(n)\right|^2} \tag{13}$$

where L is the length of the filter. The weights of a two-dimensional (2-D) multilevel wavelet transform can be obtained by straight forward extension of equations (12) and (13).

Generally, most of the energy of images remains in the low-frequency band. After wavelet decomposition, the top LL subband contains mostly the low-frequency coefficients and corresponds to the whole image with fewest coefficients compared with all other subbands. Therefore, the top LL subband contributes most to the quality of the reconstructed image. For this reason, the top LL subband is coded losslessly (see 106, FIG. 1) in the method 100 of encoding a digital image according to the present invention. Since the statistical distribution of the top LL subband is similar to the original image, it is reasonable to use a differential pulse coded modulator (DPCM) technique to encode it. The prediction error by DPCM is then less correlated and may be coded by some entropy coding methods. In the method 100 of encoding a digital image according to the present invention, lossless coding methods may include, for example and not by way of limitation, DPCM plus Huffman coding, DPCM in combination with Universal source coding or Rice coding, DPCM and arithmetic coding and any other suitable lossless coding method known to one of ordinary skill in the art.

Figure 2:
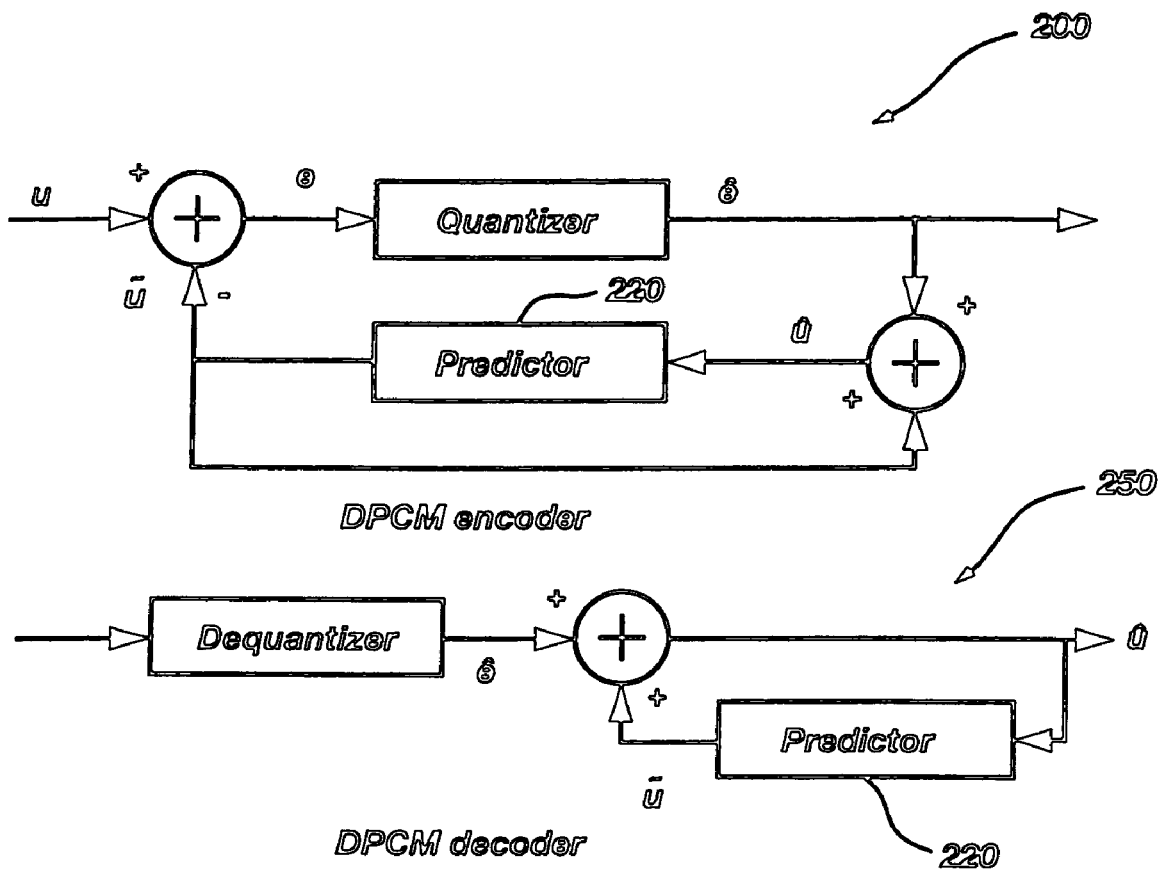
FIG. 2 is a block diagram of a DPCM encoder and a DPCM decoder in accordance with the method of the present invention.

DPCM is a well known technique for compression of highly correlated source signals, e.g., speech and images. In channel coding, the differential nature of DPCM makes it sensitive to bit error. In source coding, DPCM generally can compress images to three or four bits per pixel with minimal distortion. A conventional form of a DPCM encoder 200 and DPCM decoder 250 are shown in FIG. 2.

Figure 3:
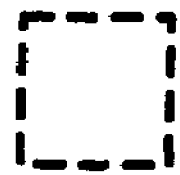
FIG. 3 is an illustration of a predictor based on a three-point operation in accordance with the method of the present invention.
Figure 3:
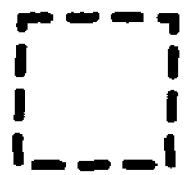
Figure 3:
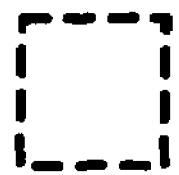
Figure 3:
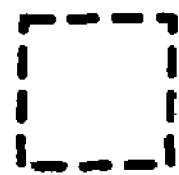
Figure 3:
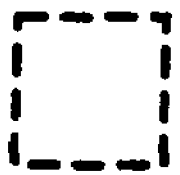
Figure 3:
Figure 3:
Figure 3:
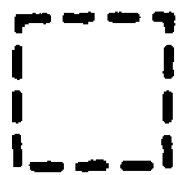
Figure 3:
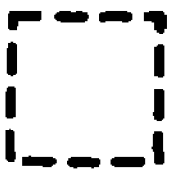
Figure 3:
Figure 3:
Figure 3:
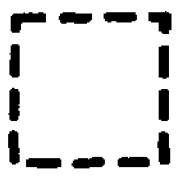
Figure 3:
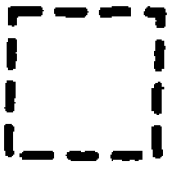
Figure 3:
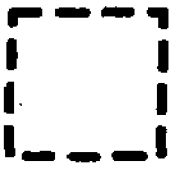
Figure 3:
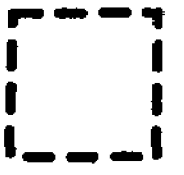
Figure 3:
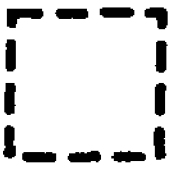

In traditional terms, it has been said that DPCM is used to remove the "redundancy" of the source signal. Strictly speaking, DPCM is used to remove the statistical correlation between samples of the source signal. In the 2-D case, such as image processing, the predictor 220 may be a 2-D linear causal predictor which may be expressed as:

$$\tilde{u}(m,n) = \sum_{k,l \in W} a(k,l)\tilde{u}(m-k, n-l) \tag{14}$$

where W is a causal prediction window. In the method 100 according to the present invention, the predictor 220 may be based on a three-point operation:

$$\tilde{u}(m,n)=\tilde{u}(m,n-1)+\tilde{u}(m-1,n)+\tilde{u}(m-1,n)+\tilde{u}(m-1,n-1) \tag{15}$$

and illustrated in FIG. 3.

The prediction error generated by a DPCM scheme is then coded by a Huffman coding technique. See for example, A. K. Jain, *Fundamentals of Digital Image Processing*, Prentice Hall, Englewood Cliffs, N.J. 07632, 1989, the disclosure of which is incorporated herein by reference in its entirety for all purposes. Huffman coding is among the best known and widely used entropy coding techniques. Huffman coding is a variable length coding based on the probability distribution of the source symbols. The basic idea of Huffman coding is to assign shorter codewords to frequently occurring, more probable symbols, and assign longer codewords to infrequently occurring, less-probable symbols. Huffman coding can achieve the optimal performance, or the compressed bit-rate that is equal to the entropy of the source symbols, only when the probabilities of the source symbols happen to be negative powers of 2. However, this case is rare in practice.

Huffman coding is known to be often quite effective for a predictive coding method. However, because Huffman coding is non-adaptive and based on the statistical distribution of a set of images, it is difficult to build a Huffman table which can give best performance for each individual image. For this reason, an adaptive coding method, such as Universal source coding may also be used to losslessly encode 106 the top LL subband of the pyramid hierarchy.

The basic idea behind Universal source coding is to first execute multiple lossless coders in parallel and then select the one that can produce the fewest bits for a given period of time, then send a small amount of overhead to inform the decoder which coder was selected. A particular Universal source coding method which may be used to losslessly encode 106 a top LL subband of the pyramid hierarchy in accordance with the present invention is disclosed in R. F. Rice, "Some Practical Universal Noiseless Coding Techniques, part iii, module psi14, k+," Tech. Rep., Jet Propulsion Laboratory, 1991, the disclosure of which is incorporated herein by reference in its entirety for all purposes and referred to herein as "Rice coding."

Figure 4:
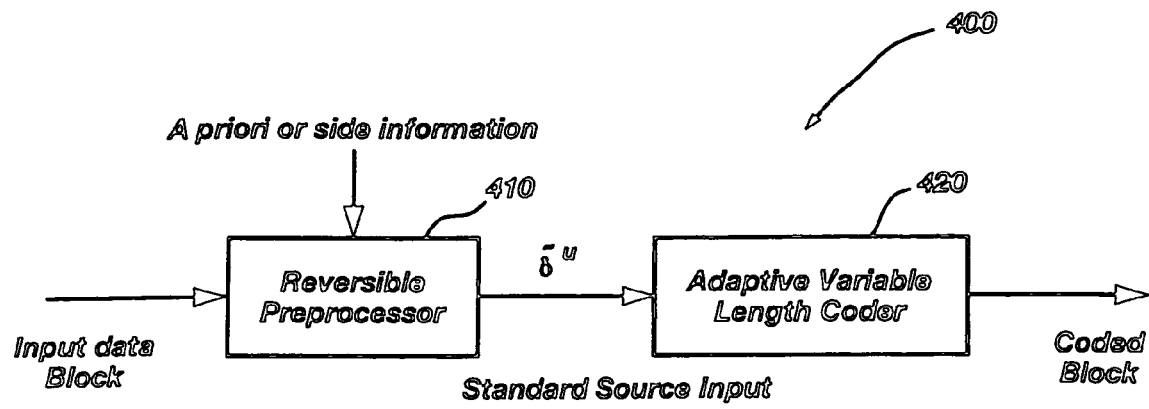
FIG. 4 is a block diagram of Universal source coder in accordance with the method of the present invention.

A block diagram of Universal source coder 400 is shown in FIG. 4. The data is input in blocks rather than by symbol and the output is likewise in block form. For the case of image data, the block can be a 2-D vector of the image to be coded. The reversible preprocessor 410, may be a DPCM coder with a 2-D predictor similar to that used in DPCM plus Huffman coding described above. The standard source which is output from the reversible preprocessor 410 is defined as a set of nonnegative integer samples, whose probability is inversely related to its value. That is, for a sequence of J samples, the standard source is:

$$\delta^n = \delta_1 \delta_2 \ldots \delta_J \tag{16}$$

where the J samples of the standard source are of values from a set of nonnegative integers, $0, 1, 2, \ldots, q-1$, and the samples of the standard source have the probability distribution:

$$P_\delta = \{p_0, p_1, \ldots, p_{q-1}\} \quad (17)$$

If the samples of the standard source are independent of themselves and any side information, and the order of their probability distribution satisfies:

$$p_0 \geq p_1 \geq \ldots \geq p_{q-1} \quad (18)$$

then the standard source is known as an idealized standard source. Thus, an idealized standard source is a set of symbols sorted in the order of their probability distribution, and is ready to build a Huffman table.

The prediction error generated by the reversible preprocessor 410 tends to be unimodal distributed, and thus, can well approximate a standard source. The prediction error is mapped into nonnegative values by:

$$\theta(\tilde{x}_j) = \min(\tilde{x}_j, 2^n - 1 - \tilde{x}_j) \quad (19)$$

For n-bit data which produces n+1 bit prediction errors, this mapping can constrain them to still only n bits. This approximate standard source is input to the adaptive variable length coder 420, e.g., a Huffman coder. The adaptive variable length coder 420 includes a set of subcoders (not shown). Each subcoder gives best performance at a certain disjoint entropy range. The bits of an N-bit input sample are first spilt into two parts: N-k most significant bits and k least significant bits. The sequence of k least significant bits is randomly distributed and does not require entropy coding. The N-k most significant bits are coded by a fixed Huffman coder. All the subcoders run in parallel. The best result is selected, and the index of this subcoder is sent as side information to inform the decoder.

Several parameters are required to configure a Universal source coder for losslessly encoding 106 a top LL subband of the pyramid hierarchy: (1) number of bits per sample—the number of bits per sample actually depends on the dynamic range of the input data, (2) number of subcoders—generally, incrementing the index of a subcoder will shift its dynamic range (entropy range) by 1 bit per sample, thus, it will be reasonable to set N subcoders for an N-bit input sequence, and (3) block size, J—it is recommended that the block size, J, be chosen in the range $1 \leq J \leq 16$, and most applications work well with a fixed J=16.

An important aspect of the method 100 of the present invention is the zerotree quantizer on the discrete wavelet transform (DWT) coefficients performed in the VQ encoding 108 of subbands other than the LL subband, hereinafter referred to as the wavelet rate-distortion adaptive residual vector quantizer (WRDADRVQ). The zerotree prediction is implicitly applied in the rate-distortion optimization. No hard thresholding is required according to the method 100 of the present invention.

In the octave pyramid decomposition, the HL, HH, LH subbands correspond to the horizontal, diagonal, and vertical directions, respectively. Each decomposition level is related to a different resolution scale. Thus, it is reasonable to use different vector shapes and sizes for different decomposition levels and subbands. However, irregular vector sizes and shapes may complicate the zerotree hierarchy and may reduce the capability of the insignificance prediction. In order to preserve the zerotree prediction, and for simplicity, uniform square vectors for all subbands are used in the method 100 of the present invention. For the WRDADRVQ, each vector in the top LL subband has three direct children vectors, and each of these three direct children vectors has four children vectors, and each of these four children vectors has four children vectors at the next level, recursively.

Figure 5:
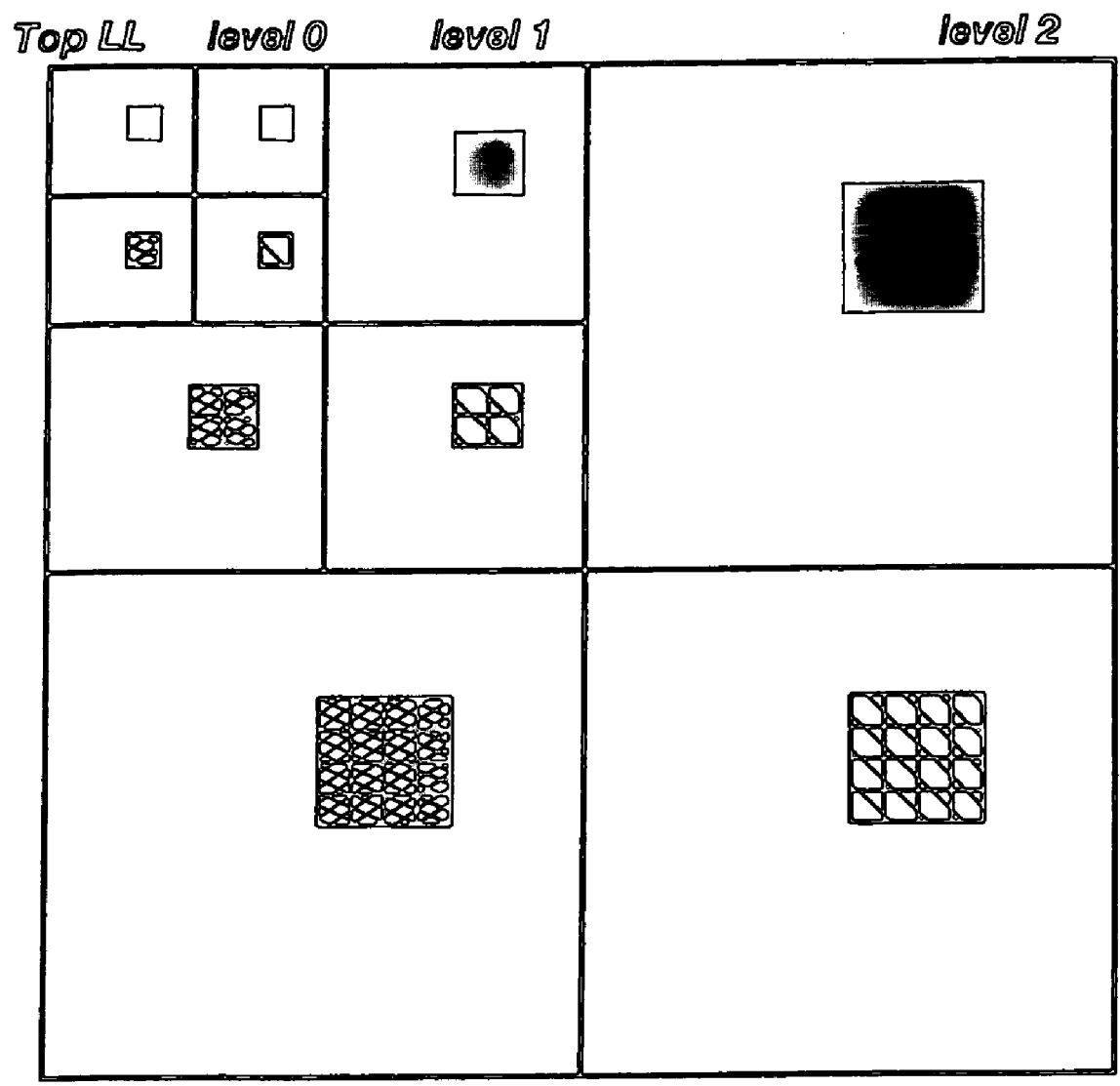
FIG. 5 is a diagram illustrating imagetree and threshtree in a pyramid hierarchy in accordance with the method of the present invention.

The parent-descendent relationship constructs a tree structure, which consists of a root vector at the top LL subband, and the root vector has three branches in the three directions (horizontal, diagonal and vertical), and each branch itself is a tree that exponentially grows by a power of four. This tree structure starting from the top LL root vector or subband is referred to herein as an "imagetree." The tree structure of each branch is referred to herein as a "threshtree." Thus, each imagetree has three threshtrees in the three directions. FIG. 5 illustrates an imagetree and its threshtrees in a pyramid hierarchy. Note that the root of an imagetree, located in the top LL subband, is losslessly coded in accordance with the method of the present invention. However, for both encoding and decoding, the top L subband is scanned vector by vector in the order of row by row. Since each vector in the top L subband is an imagetree root and identifies an imagetree, when any vector in the top LL subband is scanned, all of its three threshtrees will be coded by VQ with a rate-distortion optimization within the threshtree. In this way, after scanning the top LL subband, all the vectors in the image except for the top LL subband will be coded by VQ (see 108 of FIG. 1).

When a vector is coded by an adaptive rate-distortion optimal VQ, the resulting number of VQ stages and the indices of each coding unit will be converted into bit-stream and sent to the communication channel or saved into a data file. The bit format of a coded vector according to the present invention is shown in Table 2.

TABLE 2

| VQ Header | [VQ index 0] | [VQ index 1] | ... | [VQ index n] |
| --- | --- | --- | --- | --- |

The first (leftmost) portion of the bit format is the VQ header, which is the actual VQ stage number coded by the Huffman table, then followed by the indices of each VQ coding unit, if any. The VQ indices are directly packed into bit-stream without further coding. In the method according to the present invention, the number of vectors per coding unit is constant. So, the bit length of the VQ index of each coding unit is also constant.

The goal of rate-distortion optimization within a vector for an N-coding unit adaptive rate-distortion optimal VQ is to find the optimal number of the VQ coding unit, n, which gives the minimal cost J:

$$J = \min_N (D(n) + \lambda R(n)) \quad (20)$$

where D(n) is the distortion of n-coding unit VQ and $$R(n) = H(n) + \sum_{i=1}^{n} B(i) \quad (21)$$

is the bit length of coded VQ. H( ) is the length of the entropy code used to code the VQ header, and B(i) is the bits per coding unit for VQ index and is a constant in accordance with the present invention. The value of the VQ header, h, may be the number of the coding units for the adaptive rate-distortion optimal VQ. Since the number of maximum VQ coding units, N, is usually small, this optimization may be implemented by a simple linear search as known to one of ordinary skill in the art.

The following notation is used herein to denote the significance map symbols in the method of the present invention: SG—significant, RT—zerotree root, IZ—isolated zero, and CH—zerotree child. Only those significant vectors are actually coded by VQ. For RT and IZ, only the significance map symbols are sent. Zerotree children do not need to be coded because they can be predicted by their zerotree root. The significance map symbols are embedded in the VQ header. Hence, the value, h, of the VQ header may be defined as follows:

$$h = \begin{cases} 0 & \text{if } IZ \\ 1 \sim N & \text{if } SG \\ N+1 & \text{if } RT \end{cases} \quad (22)$$

Figure 6:
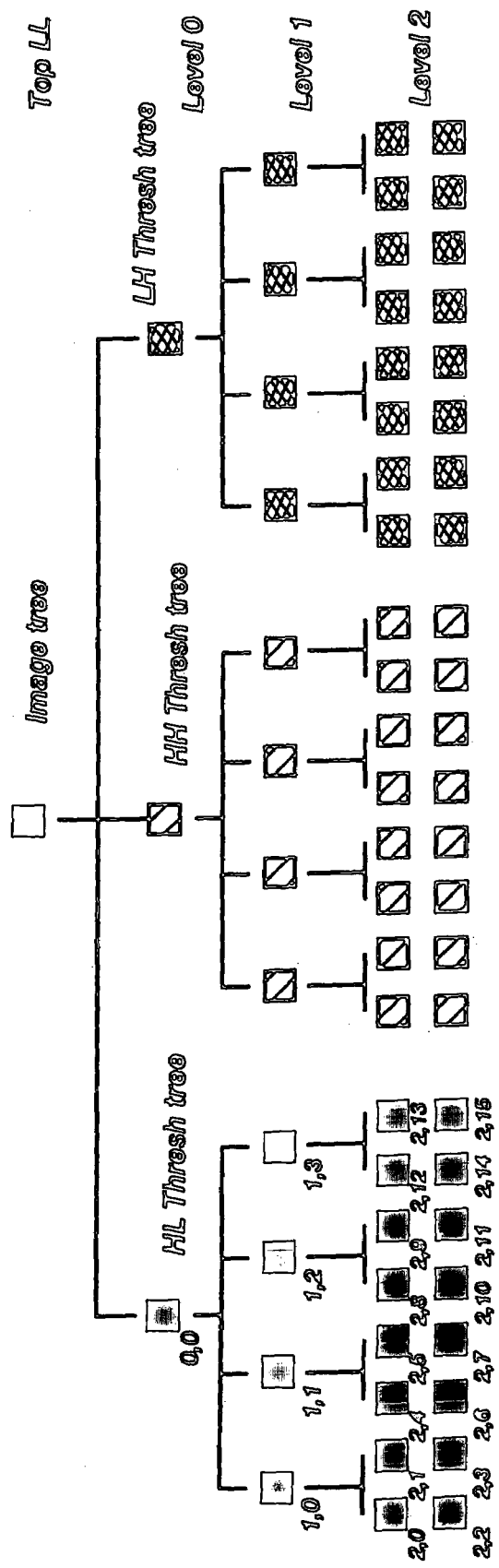
FIG. 6 is a tree diagram illustrating the structure of imagetree and threshtree according to the present invention.

To illustrate the rate-distortion optimization along a threshtree, denote the function T(s), which is defined as:

$$T(s) = \begin{cases} J & \text{for } s = SG \\ D(0) + \lambda H(N+1) & \text{for } s = RT \\ D(0) + \lambda H(0) & \text{for } s = IZ \\ D(0) & \text{for } s = CH \end{cases} \quad (23)$$

where D(0) is the distortion of the vector without VQ coding (or the "zero coding unit"). If mean square error is chosen as the measure of distortion, then D(0) is the average energy (or power) of the vector. The value of the function T(s) is the actual cost of a vector subject to its significance. Let $W_{l,p}$ be the total cost of the pth node at l DWT level and the costs of all its descendants, then $W_{l,p}$ can be expressed recursively as:

$$W_{l,p} = T(s_{(l,p)}) + \sum_{q=4p}^{q<4p+4} W_{l-1,q} \quad (24)$$

where q is the index of the four siblings belonging to a same parent. Note that the DWT level is defined as in FIG. 6, which illustrates the structure of imagetree and threshtree according to the present invention. Also note that l DWT level consists of $4^l$ nodes, starting from Level 0, as 1, 4, 16, . . . . For an L level DWT decomposition, the very bottom level satisfies:

$$W_{L-1,p} = T(s_{(L-1,p)}) \quad (25)$$

The minimal $W_{0,0}$ may be found by varying the $s_{(l,p)}$, or in other words, by a proper zerotree classification. The significance map of the threshtree is constructed from the bottom (finest) level to the top (coarsest) level (Level 0 in FIG. 6).

Figure 7:
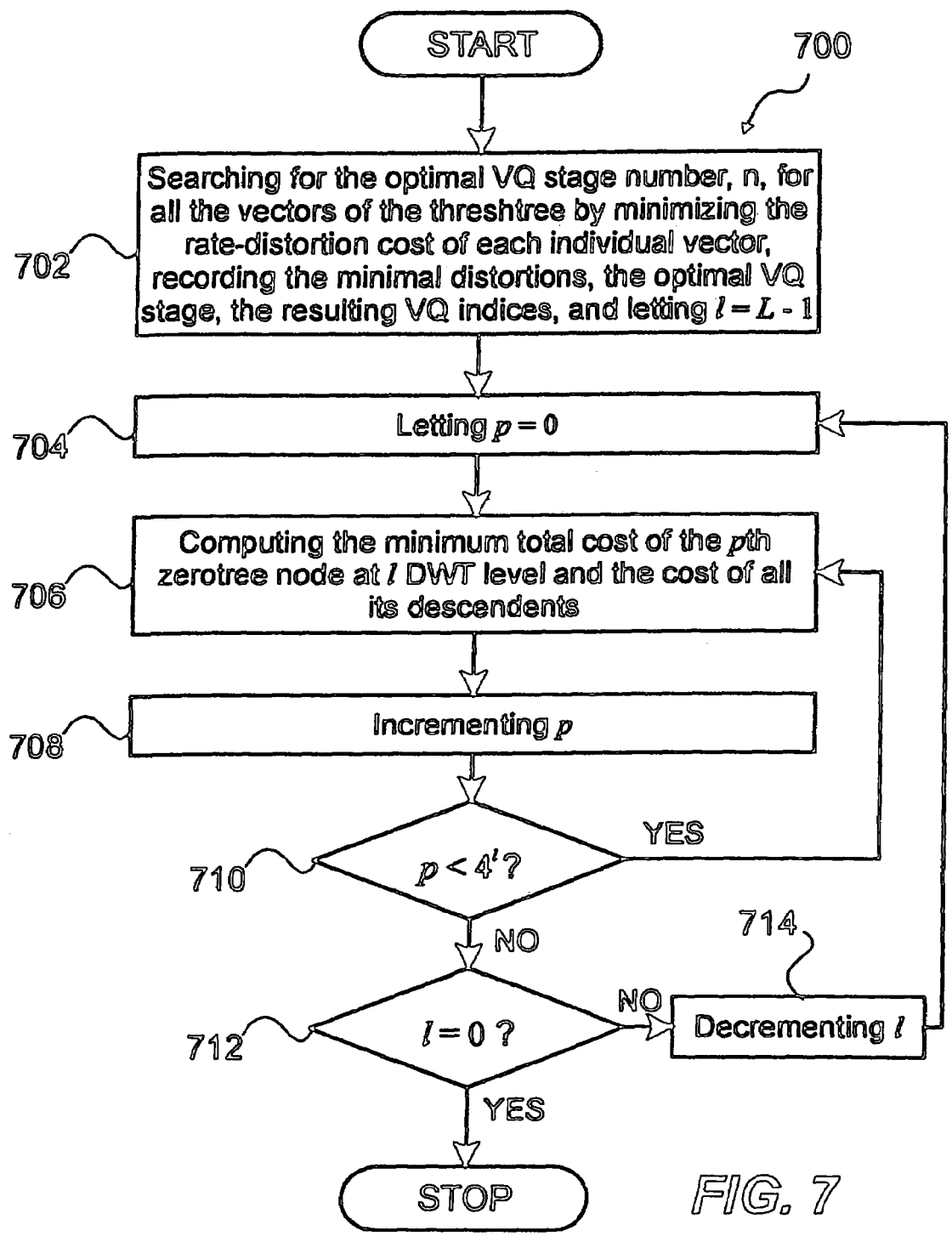
FIG. 7 is a method for constructing a significance map of a threshtree in accordance with the present invention.

Referring to FIG. 7, a method 700 for constructing a significance map of a threshtree in accordance with the present invention is shown. Method 700 includes searching 702 for the optimal VQ coding unit number, n, for all the vectors of the threshtree by minimizing the rate-distortion cost of each individual vector, recoding the minimal distortions, the optimal VQ coding unit, the resulting VQ indices, and letting l=L−1, assigning 704 the value zero top, computing 706 the minimum total cost of the pth zerotree node at l DWT level and the cost of all its descendants, incrementing 708 the value of p, if the inequality 710, $p<4^l$, is true, then returning to 706, otherwise if the equality 712, l=0, is true then stopping, otherwise decrementing 714 the value of l and returning to 704.

Computing 706 the minimum total cost of the pth zerotree node at l DWT level and the cost of all its descendants, i.e., $\min_{s_{(l,p)}}(W_{l,p})$, involves the following rules when comparing the three cases of $s_{(l,p)}$: SG, IZ, RT.

If $s_{(l,p)}$=SG, then $$W_{l,p} = T(SG) + \sum_{q=4p}^{q<4p+4} W_{l-1,q} \quad (26)$$

with the significance of all its descendants unchanged, i.e., the second part of equation (24) unchanged. If $s_{(l,p)}$=IZ, then $$W_{l,p} = T(IZ) + \sum_{q=4p}^{q<4p+4} W_{l-1,q} \quad (27)$$

with the significance of all its descendants unchanged. If $s_{(l,p)}$=RT, then $$W_{l,p} = T(RT) + \sum_{q=4p}^{q<4p+4} W_{l-1,q} \quad (28)$$

by changing the significance of all its descendants as CH. Find the minimal cost among these three cases, i.e., equations (26)-(28). If equation (28) is minimal among all three, update W for all its descendants.

The WRDADRVQ scheme does not support embedded or successive coding. The rate control is accomplished by applying the proper λ value in equation (23). For example and not by way of limitation, after the wavelet transform 104, lossless encoding 106 and VQ search 702, all VQ indices and the distortions of each coding unit are bookmarked. The wavelet transform and VQ search, which contribute most of the computational complexity, are obtained only once in the method 700. Then the λ value corresponding to the targeted rate may be performed by general searching methods, such as bi-section, golden search or other suitable methods known to one of ordinary skill in the art. The rate output by method steps 704-714 may be used to compute a fitness function.

Decoding an image encoded according to the method 100 of the present invention includes decoding the top LL subband by the lossless decoder corresponding to the lossless encoder. Since the bit-stream of VQ coded data is in the order of imagetree by imagetree, the pyramid hierarchy may be reconstructed by putting back the coefficients of the imagetree to their corresponding positions. If any vectors are predicted as zerotree children, the decoder slips the lower levels of the threshtree and fills the corresponding vectors with zero. The decoding is completed by performing an inverse DWT on the reconstructed pyramid hierarchy and the reconstructed image is complete. The method of decoding according to the present invention may include obtaining the encoded image, reconstructing a zerotree from the encoded image, vector quantization decoding subbands in the encoded image other than a top LL subband, losslessly decoding the top LL subband, reverse wavelet transforming the top LL subband and the vector quantization decoded subbands, and outputting a decoded image from the decoded top LL subband and the decoded subbands other than the decoded top LL subband.

Figure 8:
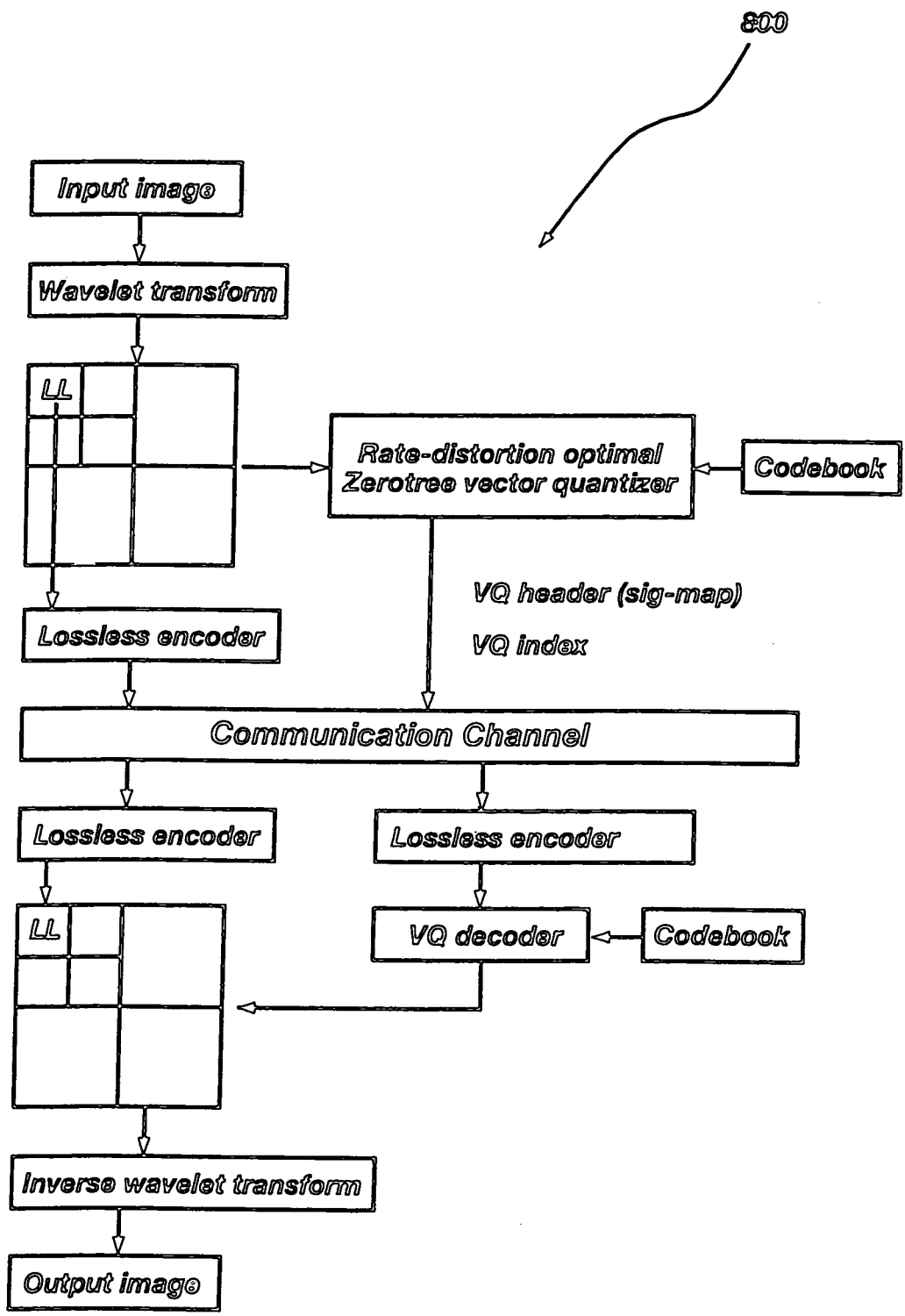
FIG. 8 is a block diagram of the method of encoding and decoding images in accordance with the invention.

Referring to FIG. 8, a block diagram of a method 800 of encoding, transmitting and decoding images in accordance with the present invention is shown. The input image is transformed into the wavelet domain using a 2-dimensional, separable octave decomposition which generates a pyramid hierarchy. The top LL subband of the hierarchy is coded losslessly. Lossless encoding methods used to code the top LL subband may include, for example and not by way of limitation, DPCM plus Huffman encoding, DPCM plus Universal source encoding also known as Rice encoding and DPCM plus arithmetic coding. The other subbands are vector quantized based on a zerotree insignificance prediction. Only significant vectors are vector quantization (VQ) encoded. The symbols of the significance map are embedded in the VQ headers. Additionally, a rate-distortion trade-off is applied in the vector quantization step. Decoding according to the method 800 involves the reverse of the above-referenced procedures.

Figure 9:
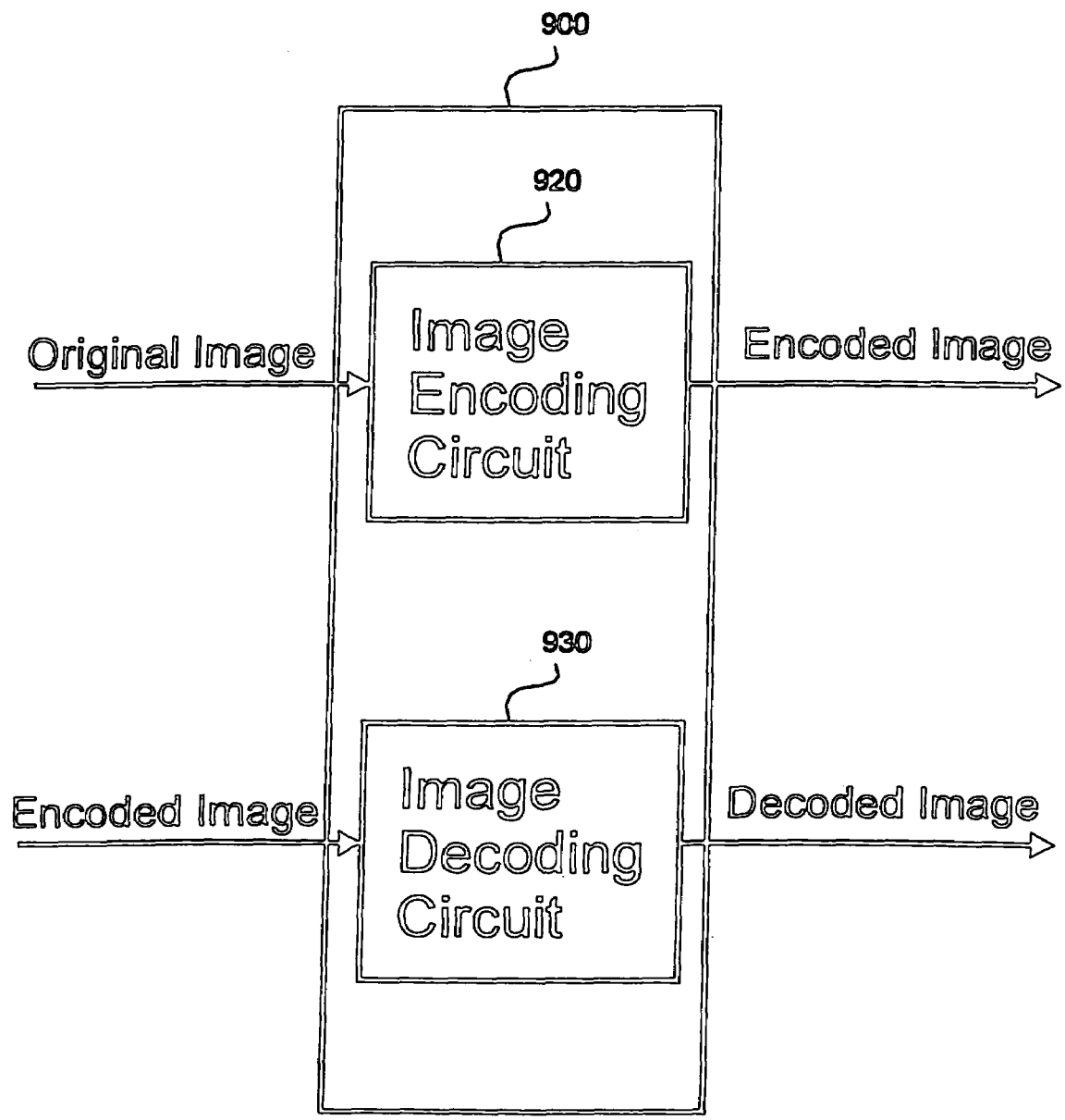
FIG. 9 are block diagrams of integrated circuits implementing the method of encoding and decoding of still images in accordance with the method of FIG. 8.

The method 800 of encoding and decoding still images by rate-distortion adaptive zerotree-based residual vector quantization of the present invention may be implemented in one or more integrated circuits. Referring to FIG. 9, a block diagram illustrating an image encoding circuit 920, an image decoding circuit 930 and an image coding/decoding (or "codec") circuit 900 are shown. The image encoding circuit 920 may be used to encode an original image using the method 800 of FIG. 8. An original image from any source (not shown) is input into the image encoding circuit 920. The source may be, for example and not by way of limitation, a digital camera, a scanner, a digital data storage medium, or other digital data source. The output of the image encoding circuit 920 is an image encoded according to the rate-distortion adaptive zerotree-based residual vector quantization method 800 of the present invention. The image encoding circuit 920 may be designed and implemented in an integrated circuit using techniques known to one of ordinary skill in the art.

The image decoding circuit 930 may be used to decode an image encoded by the rate-distortion adaptive zerotree-based residual vector quantization method 800 of the present invention. An encoded image is input into the image decoding circuit 930. The output of the image decoding circuit 930 is a decoded image. The image decoding circuit 930 may be designed and implemented in an integrated circuit to implement the decoding method using techniques known to one of ordinary skill in the art.

Figure 10:
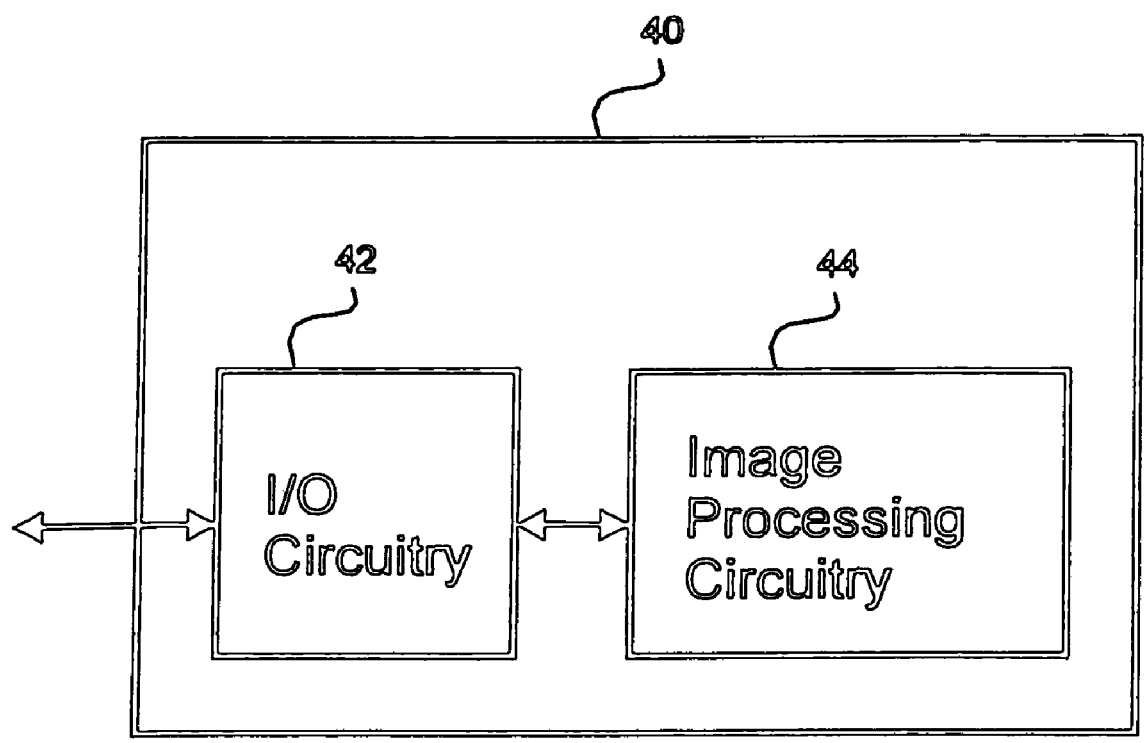
FIG. 10 is a block diagram of a circuit card embodiment of the invention including the method disclosed in FIG. 8.

The method 800 of encoding and decoding still images by rate-distortion adaptive zerotree-based residual vector quantization 10, may be implemented in a circuit card 40 embodiment of the invention. Referring to FIG. 10, a block diagram of a circuit card 40 implementing the method of the invention is shown. Circuit card 40 may be configured to receive an original image (prior to image compression) and may output an encoded image. Circuit card 40 may be configured to receive an encoded image and output a decoded image. Circuit card 40 may be configured to receive either an original image or an encoded image and output, respectively, either an encoded image or a decoded image. Circuit card 40 includes I/O circuitry 42 for communicating with external circuitry, such as for example, a computer system (not shown). Circuit card 40 also includes image processing circuitry 44 for encoding and decoding digital images according to the method 800 of FIG. 8. Image processing circuitry 44 may comprise a single integrated circuit. Image processing circuitry 44 may comprise two integrated circuits such as an image encoding circuit 920 and an image decoding circuit 930 as depicted in FIG. 9. Image processing circuitry 44 may include more than two discrete integrated circuits. The image processing circuitry 44 and circuit card 40, may be designed to implement the rate-distortion adaptive zerotree-based residual vector quantization method 800 by incorporating all necessary circuitry into, for example and not by way of limitation, an application specific integrated circuit (ASIC) using techniques known to those of ordinary skill in the art.

Figure 11:
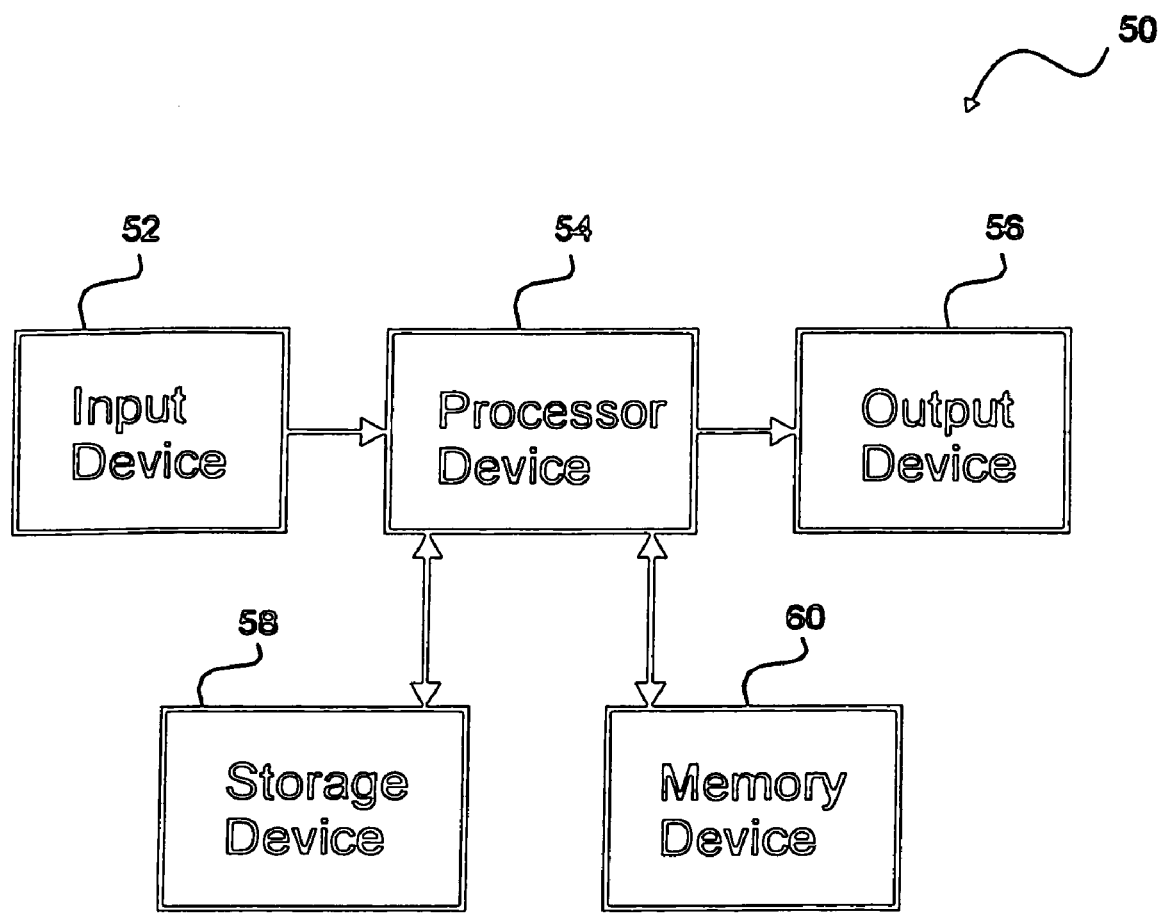
FIG. 11 is a block diagram of a system embodiment of the invention including the method disclosed in FIG. 8.

The method of encoding and decoding still images by rate-distortion adaptive zerotree-based residual vector quantization 800 as shown in FIG. 8 may be implemented in a system for encoding, transmitting and decoding still images. FIG. 11 is a block diagram of a system 50 embodiment of the invention including the method 800 disclosed in FIG. 8. System 50 includes an input device 52, a processor device 54, an output device 56, a storage device 58 and a memory device 60. Input device 52 may be, for example and not by way of limitation, a digital camera, a scanner, a digital data storage medium, or other digital data source. Output device 56 may be, for example and not by way of limitation, a monitor, a printer. Input device 52 and output device 56 may be a network interface card for communicating with external computer systems. Processor device 54 may be a general purpose microprocessor or a digital signal processor. Memory device 60 may be any form of conventional computer memory (i.e., read only memory (ROM), dynamic read only memory (DRAM), etc.) for storing data and/or computer program instructions. Storage device 58 may be, for example and not by way of limitation, a fixed hard disk, a removable media disk, e.g., floppy disk, Zip® disk, Jaz® disk, compact disk (CD) read only memory (ROM), CD rewriteable (CD-RW), magneto-optic (MO) disk, etc., or conventional computer memory. System 50 may also be video system for encoding and decoding video frames in a video system.

Another system embodiment (not shown) in accordance with the present invention may further include two systems 50 interconnected through a communications channel for encoding an original image with the first of two systems 50, transmitting the encoded image with the first of two systems 50 over the communications channel to a selected destination, wherein the selected destination includes a second of two systems 50, decoding the encoded image with the second of two systems 50 to provide a decoded image at the selected destination.

Although this invention has been described with reference to particular embodiments, the invention is not limited to these described embodiments. Rather, it should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. A method, comprising using a system to perform the steps of:

generating a hierarchy based at least on a transformation of a digital image comprising a low-low (LL) subband and a corresponding plurality of threshtrees, the threshtrees include a tree structure including a plurality of levels, each level including a plurality of vectors each associated with a plurality of descendent vectors of a subsequent level up to a final level;

losslessly encoding the low-low (LL) subband of said hierarchy;

vector quantization encoding the plurality of threshtrees based at least in part on a zerotree insignificance prediction, wherein vector quantization encoding comprises selecting a significance map of each threshtree having a minimized cost function according to a rate-distortion optimization by, for each current vector of the plurality of vectors, determining a descendent cost as a cost of one or more descendent vectors of the current vector;

determining an alternate descendent cost as a cost of one or more descendent vectors of the current vector if all descendent vectors of the current vector are considered to be zerotree children;

determining a significant vector cost as a combination of the descendent cost and a cost of the current vector;

determining an isolated zero cost as a combination of the descendent cost and a cost of coding the current vector as an isolated zero;

determining a zerotree cost as a combination of the alternate descendant cost and a cost of coding the current vector as a zerotree root;

symbolizing the current vector as the zerotree root if the zerotree cost is less than the isolated zero cost and less than the significant vector cost;

symbolizing the current vector as the isolated zero if the isolated zero cost is less than the zerotree cost and the significant vector cost;

symbolizing the current vector as significant if the significant vector cost is less than the isolated zero cost and the zerotree cost; and redefining the cost of all descendent vectors of the current vector to the alternate descendent cost if the current vector is symbolized as the zerotree root; and generating an encoded image based on a combination of both the encoded LL subband and the encoded plurality of threshtrees.

2. A method according to claim 1, wherein said hierarchy comprises a pyramid hierarchy.

3. A method according to claim 1, wherein said generating the hierarchy comprises transforming said digital image into a wavelet domain.

4. A method according to claim 1, wherein said generating the hierarchy comprises applying a 2-dimensional separable octave decomposition to said digital image.

5. A method according to claim 1, wherein said generating the hierarchy comprises applying a Daubechies 9-7 symmetric wavelet transformation to said digital image.

6. A method according to claim 1, wherein said generating the hierarchy comprises applying a two six wavelet transformation to said digital image.

7. A method according to claim 1, wherein said generating the hierarchy comprises applying a two ten wavelet transformation to said digital image.

8. A method according to claim 1, wherein said encoding the LL subband comprises applying a differential pulse coded modulation, a Huffman coding, or combinations thereof to said LL subband.

9. A method according to claim 1, wherein said encoding the LL subband comprises applying a differential pulse coded modulation, a universal source coding, or combinations thereof to said LL subband.

10. A method according to claim 1, wherein said encoding the LL subband comprises applying a differential pulse coded modulation, an arithmetic coding, or combinations thereof to said LL subband.

11. A method according to claim 1, wherein said vector quantization encoding comprises targeted rate control.

12. An article comprising: a computer-readable medium encoded with a computer program having stored thereon instructions that if executed result in:

generating a hierarchy based at least on a transformation of a digital image the hierarchy comprising low-low (LL) subband vectors and a plurality of threshtrees, the threshtrees comprising a plurality of vectors having descendent vectors associated therewith;

losslessly encoding the LL subband vectors of said hierarchy;

vector quantization encoding the threshtrees based at least on a zerotree insignificance prediction by, for each current vector of the plurality of vectors, determining a descendent cost as a cost of one or more descendent vectors of the current vector;

determining an alternate descendent cost as a cost of one or more descendent vectors of the current vector if all descendent vectors of the current vector are considered to be zerotree children;

determining a significant vector cost as a combination of the descendent cost and a cost of the current vector;

determining an isolated zero cost as a combination of the descendent cost and a cost of coding the current vector as an isolated zero;

determining a zerotree cost as a combination of the alternate descendant cost and a cost of coding the current vector as a zerotree root;

symbolizing the current vector as the zerotree root if the zerotree cost is less than the isolated zero cost and less than the significant vector cost;

symbolizing the current vector as the isolated zero if the isolated zero cost is less than the zerotree cost and the significant vector cost;

symbolizing the current vector as significant if the significant vector cost is less than the isolated zero cost and the zerotree cost; and redefining the cost of all descendent vectors of the current vector to the alternate descendent cost if the current vector is symbolized as the zerotree root; and generating an encoded image based on a combination of both the encoded LL subband and the encoded threshtrees.

13. An article according to claim 12, wherein said hierarchy comprises a pyramid hierarchy.

14. An article according to claim 13, wherein generating the hierarchy comprises applying a 2-dimensional separable octave decomposition to said digital image.

15. An article according to claim 12, wherein generating the hierarchy comprises transforming said digital image into a wavelet domain.

16. An article according to claim 12, wherein generating the hierarchy comprises applying a Daubechies 9-7 symmetric wavelet transformation to said digital image.

17. An article according to claim 12, wherein generating the hierarchy comprises applying a two six wavelet transformation to said digital image.

18. An article according to claim 12, wherein generating the hierarchy comprises applying a two ten wavelet transformation to said digital image.

19. An article according to claim 12, wherein encoding the LL subband comprises applying a differential pulse coded modulation, a Huffman coding to said LL subband, or combinations thereof.

20. An article according to claim 12, wherein encoding the LL subband comprises applying a differential pulse coded modulation, a universal source coding to said LL subband, or combinations thereof.

21. An article according to claim 12, wherein encoding the LL subband comprises applying a differential pulse coded modulation, an arithmetic coding to said LL subband, or combinations thereof.

22. An article according to claim 12, wherein said vector quantization encoding comprises targeted rate control.

23. A method, comprising using a system to perform:
generating a hierarchy based at least on a transformation of a digital image comprising a plurality of threshtrees, the threshtrees include a tree structure including a plurality of levels, each level including a plurality of vectors each associated with a plurality of descendent vectors of a subsequent level up to a final level;
vector quantization encoding the plurality of threshtrees based at least on a zerotree insignificance prediction, wherein vector quantization encoding comprises selecting a significance map of each threshtree, by, for each of a current vector of the plurality of vectors,
determining a descendent cost as a cost of one or more descendent vectors of the current vector;
determining an alternate descendent cost as a cost of one or more descendent vectors of the current vector if all descendent vectors of the current vector are considered to be zerotree children;
determining a significant vector cost as a combination of the descendent cost and a cost of the current vector;
determining a zerotree cost as a combination of the alternate descendant cost and a cost of coding the current vector as a zerotree root;
symbolizing the current vector as the zerotree root if the zerotree cost is less than the significant vector cost;
symbolizing the current vector as significant if the significant vector cost is less than the zerotree cost; and
redefining the cost of all descendent vectors of the current vector to the alternate descendent cost if the current vector is symbolized as the zerotree root; and
generating an encoded image based on the encoded plurality of threshtrees.

24. The method of claim 23, wherein selecting a significance map of each threshtree further comprises:
determining an isolated zero cost as a combination of the descendent cost and a cost of coding the current vector as an isolated zero; and
symbolizing the current vector as the an isolated zero if the isolated zero cost is less than the zertotree cost and less than the significant vector cost.

25. A method according to claim 23, wherein the hierarchy comprises a pyramid hierarchy.

26. A method according to claim 23, wherein generating the hierarchy comprises at least one of transforming the digital image into a wavelet domain, applying a 2-dimensional separable octave decomposition to the digital image, applying a Daubechies 9-7 symmetric wavelet transformation to the digital image, applying a two six wavelet transformation to the digital image, and applying a two ten wavelet transformation to the digital image.

27. A method, comprising using a system to perform:
generating a hierarchy based at least on a transformation of a digital image comprising a plurality of threshtrees, the threshtrees include a tree structure including a plurality of levels, each level including a plurality of vectors each associated with a plurality of descendent vectors of a subsequent level up to a final level;
vector quantization encoding the plurality of threshtrees based at least on a zerotree insignificance prediction, wherein vector quantization encoding comprises selecting a significance map of each threshtree having a reduced cost function according to a rate-distortion optimization by, for each of a current vector of the plurality of vectors,
determining a descendent cost as a cost of one or more descendent vectors of the current vector;
determining a significant vector cost as a combination of the descendent cost and a cost of the current vector;
determining an isolated zero cost as a combination of the descendent cost and a cost of coding the current vector as an isolated zero; and
symbolizing the current vector as whichever of the isolated zero and significant vector has the least cost; and
generating an encoded image based on the encoded plurality of threshtrees.

28. A method according to claim 27, wherein the hierarchy comprises a pyramid hierarchy.

29. A method according to claim 27, wherein generating the hierarchy comprises at least one of transforming the digital image into a wavelet domain, applying a 2-dimensional separable octave decomposition to the digital image, applying a Daubechies 9-7 symmetric wavelet transformation to the digital image, applying a two six wavelet transformation to the digital image, and applying a two ten wavelet transformation to the digital image.

30. A method, comprising using a system to perform:
generating a hierarchy based at least on a transformation of a digital image comprising a plurality of threshtrees, the threshtrees include a tree structure including a plurality of levels, each level including a plurality of vectors each associated with a plurality of descendent vectors of a subsequent level up to a final level;
vector quantization encoding the plurality of threshtrees based at least on a zerotree insignificance prediction, wherein vector quantization encoding comprises selecting a significance map of each threshtree having a reduced cost function according to a rate-distortion algorithm by, for each of a current vector of the plurality of vectors, symbolizing the current vector as either an isolated zero, zerotree root, or significant vector according to whichever of the isolated zero and significant vector has the least cost according to a rate distortion algorithm, wherein a cost of the significant vector is calculated by
determining a descendent cost as a cost of one or more descendent vectors of the current vector; and
determining a significant vector cost as a combination of the descendent cost and a cost of the current vector; and
generating an encoded image based on the encoded plurality of threshtrees.

31. The method of claim 30, further comprising determining an isolated zero cost as a combination of the descendent cost and a cost of coding the current vector as an isolated zero.

32. The method of claim 30, further comprising
determining an alternate descendent cost as a cost of one or more descendent vectors of the current vector if all descendent vectors of the current vector are considered to be zerotree children;
determining a zerotree cost as a combination of the alternate descendant cost and a cost of coding the current vector as a zerotree root.

* * * * *

UNITED STATES PATENT AND TRADEMARK OFFICE
CERTIFICATE OF CORRECTION

PATENT NO.         : 7,602,982 B2                                            Page 1 of 1
APPLICATION NO. : 11/205366
DATED                 : October 13, 2009
INVENTOR(S)        : Budge et al.

It is certified that error appears in the above-identified patent and that said Letters Patent is hereby corrected as shown below:

On Page 2, in Item (56) References Cited, under OTHER PUBLICATIONS, in Column 1, Lines 1-2, delete "M. Anotonini et al., 'Image Coding using wavelet transform,' IEEE Transactions on Image Processing, vol. 1., No. 2, pp. 205-220."

On Page 2, in Item (56) References Cited, under OTHER PUBLICATIONS, in Column 1, Lines 11-13, delete "M.J. Gormish et al., 'Lossless and nearly lossless compression for high quality images', Tech. Rep. Ricoh California Research Center, 2882 Sand Hill Road, Suite 115, Menlo Park, CA 94025-7022."

Column 14
Lines 57-58, delete "the steps of"

Column 15
Line 2, delete "in part"
Line 6, after "each" insert --of a--

Column 16
Line 5, delete "image" and insert --image,--
Line 12, after "each" insert --of a--

Column 17
Line 17, delete "threshtree," and insert --threshtree--
Line 44, delete "the an" and insert --the--
Line 45, delete "zertotree" and insert --zerotree--

Signed and Sealed this

First Day of December, 2009

David J. Kappos
*Director of the United States Patent and Trademark Office*